United States Patent
Hirata et al.

(10) Patent No.: US 6,596,396 B2
(45) Date of Patent: Jul. 22, 2003

(54) THIN-FILM-LIKE PARTICLES HAVING SKELETON CONSTRUCTED BY CARBONS AND ISOLATED FILMS

(75) Inventors: Masukazu Hirata, Tsukuba (JP); Shigeo Horiuchi, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/923,404

(22) Filed: Aug. 8, 2001

(65) Prior Publication Data

US 2002/0022122 A1 Feb. 21, 2002

(30) Foreign Application Priority Data

Aug. 9, 2000 (JP) ........................................ 2000-277307
Jul. 19, 2001 (JP) ........................................ 2001-219628

(51) Int. Cl.[7] ................................................ B32B 5/16
(52) U.S. Cl. ...................... 428/402; 428/403; 428/404; 106/472; 106/474; 106/478; 106/438
(58) Field of Search ............................... 428/403, 402, 428/404; 106/472, 474, 478, 436

(56) References Cited

U.S. PATENT DOCUMENTS 2,798,878 A   7/1957   Hummers ................... 562/400
5,228,911 A * 7/1993   Kunii et al. ................ 106/478

FOREIGN PATENT DOCUMENTS

JP   11263613   9/1999

OTHER PUBLICATIONS

"Graphite Interlaminar Compound". Carbon Material Society, 1990.*
"Preparation of Graphite Oxide", Hummers et al., J. Amer. Chem. Soc., 80, 1339 (1958).
"Graphite Interlaminar Compound", Carbon Material Society (1990).
"FTIR and $^{13}C$ NMR Study of Graphite Oxide", Mermoux et al., Carbon, 29, 469 (1991).
"Vibrational Spectra of the Monolayer Films of Hexagonal Boron Nitride and Graphite on Faceted Ni(755)", Rokuta et al., Surface Sci., 427–428, 97 (1997).

* cited by examiner

Primary Examiner—Leszek Kiliman
(74) Attorney, Agent, or Firm—Roylance, Abrams, Berdo & Goodman, L.L.P.

(57) ABSTRACT

Thin-film-like particles and isolated films of an extremely small thickness having a skeleton constructed by carbons are provided. The thin-film-like particles take independent shapes, have a thickness of 0.4 to 10 nm and a breadth in a planar direction of 20 nm or more, and can disperse in a liquid having a relative dielectric constant of 15 or more. The thin-film-like particles are obtained by promoting separation of layers in oxidation of graphite. The particles in their dispersion are placed, along with the dispersion, on a mesh, and dried to obtain an isolated thin film. The thin-film-like particles are reduced to obtain thin-film-like graphite particles and these collective matters.

15 Claims, 8 Drawing Sheets

THIN-FILM-LIKE PARTICLES HAVING SKELETON CONSTRUCTED BY CARBONS AND ISOLATED FILMS

BACKGROUND OF THE INVENTION

This invention relates to thin-film-like particles of a very small thickness having a skeleton constructed by carbons, and monolayer and stacked-layer very thin isolated films composed of the particles.

In recent years, search for a substance highly anisotropic in shape and its applications have progressed rapidly. A composite of such a substance, gathered in a large number, with other substance can be expected to exhibit various properties, such as high strength, when added at a low fraction. If the substance has a very fine linear (one-dimensional) or very thin planar (two-dimensional) shape and is electrically a semiconductor or a conductor, the substance used alone, or a collective matter of a small number of the substances, can be expected to show a quantum effect in electronic properties.

Among substances having carbon atoms as a skeleton and having an anisotropic shape, a graphite fiber and a carbon nanotube, which is a particularly fine form of the graphite fiber, are known as one-dimensional substances, while graphite, graphite fluoride and graphite oxide are known as two-dimensional substances. Of these substances, graphite, graphite fluoride and graphite oxide are all multi-layer structure materials comprising two-dimensional fundamental single layers stacked, and the number of the layers is generally very large. The fundamental layer of graphite (the fundamental layer is called graphene, and composed of carbons alone) comprises carbons of $sp^2$ bonds, and has a structure of one carbon atom thick (0.34 nm). The fundamental layer of graphite fluoride has a structure comprising a $sp^3$-bonded carbon skeleton of one or two carbon atoms thick counted as rows of diamond-like zigzag carbons, and fluorine bonded to both surfaces of the skeleton. The fundamental layer of graphite oxide is assumed to have a structure comprising a carbon skeleton composed mainly of $sp^3$ bonds with a slight tendency toward $sp^2$ bonds and similarly one or two carbon atoms thick counted as rows of zigzag carbons, and acidic hydroxyl groups or the like bonded to both sides of the skeleton (the structure is 0.61 nm thick, if the thickness of the carbon skeleton is equal to the dimension of one carbon atom, hydroxyl groups, etc. are present on both sides of the skeleton, and intercalated water is very little) (for example, "Graphite Intercalation Compounds", Chapter 5, edited by Carbon Materials Association, Realize Co. (1990); T. Nakajima et al., Carbon, 26, 357 (1988); M. Mermoux et al., Carbon, 29, 469(1991)). When the graphite oxide is highly oxidized and thoroughly dried, its oxygen content is about 40 wt. %.

The electronic structure of graphite and that of graphene are theoretically known to differ slightly. Graphene does not occur naturally, and there is an example of its synthesis as a film deposited on the surface of a nickel crystal by CVD (E. Rokuta et al., Surf. Sci., 427–428, 97(1999)). However, there has been no example of graphene actually prepared as an isolated thin film.

Examples in which such multi-layer structure materials having a carbon skeleton are separated into many fundamental layers include a material having isoprene or the like polymerized in interlayer spaces of graphite (H. Shioyama, Carbon, 35, 1664(1997)), a material having polyethylene oxide penetrating interlayer spaces of graphite oxide (Y. Matsuo et al., Carbon, 34, 672(1996)), and a material having aniline or the like polymerized in interlayer spaces (Japanese Unexamined Patent Publication No. 1999-263613).

In these examples involving separation of the multi-layer structure, the fundamental layers or very thin layers close to them are only existent as constituent components inside the composite, and have not been withdrawn separately and stably. That is, very thin-film-like particles, which have a carbon skeleton with high crystallinity and which can exist as independent particles, have not been discovered. An isolated film that is formed by the linkage of the separated thin layers has not been formed.

The object of the present invention is to provide such thin-film-like particles and an isolated films relatively similar to graphene, but different in structure from graphene.

SUMMARY OF THE INVENTION

To attain the above object, the inventors of the present invention selected the graphite oxide, in which separation of the layers can be expected to occur relatively easily, from the aforementioned three multi-layer structure materials, and further performed its synthesis (oxidation and purification) for promoted separation of the layers, thereby obtaining the desired thin-film-like particles. The structure of the thin-film-like particle is practically equal to the structure of graphite oxide so far known, unless it is very thin. However, the thin-film-like particle has a hitherto unknown, very thin shape, namely, a shape with a very small thickness relative to a breadth in its planar direction. When expressed as the number of layers within the particle, the thickness is less than 20 times the thickness of the fundamental layer. Consequently, the thin-film-like particle can even deform flexibly, although it has a dense carbon skeleton.

The thin-film-like particles are desirably handled as a dispersion in a liquid. However, studies were conducted not only of water, a dispersion medium immediately after synthesis, but also of replacement by other dispersion media. Through these studies, the inventors facilitated applications to composing of the thin-film-like particles with other substances. Furthermore, they made it possible to reduce the thin-film-like particles into thin-film-like graphite particles with a very small thickness and having a nearly graphite-like structure, or a collective matter of the thin-film-like graphite particles, as is known with ordinary graphite oxide.

Besides, the particles in the dispersion can be placed, along with the dispersion, on a mesh, and dried, whereby isolated thin films out of contact with the substrate can be obtained by the linkage of thin-film-like particles.

Graphite with a well-developed layer structure and high crystallinity is desirable as a raw material for the thin-film-like particles of the present invention. In such graphite, the respective fundamental layers are large, and the frequency of existence of a bonds tying the adjacent two fundamental layers together is extremely low. Thus, the graphite is liable to separate into thin-film-like particles after an oxidation reaction. With graphite having an undeveloped layer structure and low crystallinity, by contrast, oxidation occurs, but separation of the layers is extremely difficult. More concretely, desirable graphite is one in which the diameter of the widest fundamental layer within the particle is nearly equal to the diameter of the particle, and the entire particle has a single multi-layer structure. Known examples of such graphite are natural graphite (especially, of a high quality), kish graphite (especially, one produced at high temperatures), and highly oriented pyrolytic graphite. The respective fundamental layers of natural graphite and kish graphite are each an single crystal having a nearly single orientation, while the respective fundamental layers of highly oriented pyrolytic graphite are each a collective matter of many small crystals having different orientations. In the present invention, any of these graphites, or exfoliated graphite having the interlayer spaces of these graphites broadened beforehand is used as the starting material.

The size of the fundamental layer of graphite, and the size of a minute part within the fundamental layer can be estimated from the shapes of peaks in X-ray diffraction, by observation of an electron channeling contrast image under a scanning electron microscope, or by observation under a polarization microscope. Other indicators include, for example, an electric resistance of about $10^{-6}$ $\Omega$m or less. However, such indicators only show the possibility for separation of the layers. Actually, therefore, it is desirable to perform oxidation and purification using the intended graphite material and confirm the separation of a multi-layer structure into individual layers.

Impurities in the graphite, such as metal elements, are desirably decreased to a content of about 0.5% or less beforehand. If the content of the impurities is high, separation of the multi-layer structure into the layers may be impaired.

The particle diameter of graphite is reflected in the size in the planar direction of the resulting thin-film-like particle, and thus may be selected according to the size of the thin-film-like particle to be synthesized. Thin-film-like particles having a breadth of several millimeters or more can be essentially synthesized. However, as the diameter of the particle increases, the time required for oxidation lengthens. If it is desired to define the shape in the planar direction of the resulting thin-film-like particle, for example, as a square, the starting graphite may be cut beforehand to a square shape. However, the orientation of the crystal needs to be recognized at the time of cutting.

For oxidation of graphite in the present invention, there can be employed the publicly known methods, such as the Brodie method (using nitric acid and potassium chlorate), the Staudenmaier method (using nitric acid, sulfuric acid, and potassium chlorate), and the Hummers-Offeman method (using sulfuric acid, sodium nitrate, and potassium permanganate). Of these methods, the Hummers-Offeman method (W. S. Hummers et al., J. Am. Chem. Soc., 80, 1339(1958); U.S. Pat. No. 2,798,878 (1957)) particularly results in the higher degree of oxidation. This method of oxidation is particularly recommended in the present invention.

With any of these methods for oxidation of graphite, ions of an oxidizing agent first penetrate into interlayer spaces of the graphite to form an intercalation compound. Then, water is added to hydrolyze the intercalation compound, forming graphite oxide. Of these reactions, the formation of the intercalation compound particularly takes time, and depends on the particle diameter of graphite. Hence, it is desired to vary the time for coexistence with the oxidizing agent according to the particle diameter of graphite, and allow as many ions of the oxidizing agent as possible to penetrate the interior of the graphite particles. Investigation by the inventors showed the penetration of about 10 $\mu$m or more of ions per hour at a temperature of about 20° C. according to the Hummers-Offeman method. In this view, it is desirable to oxidize graphite for an oxidizing time of at least 30 minutes, if possible, 3 hours or more, for a particle diameter of 10 $\mu$m of graphite.

According to the foregoing methods of oxidizing graphite, it is necessary to purify the product by removing the oxidizing agent remaining in the reaction mixture, or ions resulting from decomposition of the oxidizing agent, or components derived from the ions. With the publicly known method for oxidation, this purification is performed by washing with water or alcohol. In the present invention, components, which may remain in the reaction mixture or in the interlayer spaces to hinder separation of the layers, are removed more aggressively at this purification stage to promote separation into thin-film-like particles. That is, low molecules and small ions coexisting in the liquid, other than the dispersion medium, are maximally removed, thereby increasing the degree of ion dissociation of the acidic hydroxyl groups present in the respective layers of graphite oxide, and enhancing electrostatic repulsion among the respective layers deemed to be ionic large particles, to promote the separation of the multi-layer structure into the layers.

Investigation by the inventors showed that when the concentration of sulfuric acid was about 0.05 wt. % or less, for example, at a graphite oxide concentration of about 1 wt. % or less, separation of the multi-layer structure into the layers proceeded promptly. Assuming that the ion dissociation of sulfuric acid occurs up to one stage, the concentration of small ions other than those derived from graphite oxide in the reaction mixture (including hydrogen ions formed by ion dissociation of graphite oxide) is calculated at about 10 mol/$m^3$ or less. Thus, the product is desirably purified until this concentration or lower is reached. Generally, as this purification is progressed, separation of the layers proceeds. Concretely, after water is added, water is removed together with the small ions. The water used is desirably of a high purity.

To proceed with the separation of the respective layers which are ionic large particles, on the other hand, it is important to lower the concentration of graphite oxide particles in the liquid during purification and raise the degree of ion dissociation of the respective layers. Thus, the concentration of graphite oxide at a stage, where the particles have been dispersed uniformly upon addition of water, is set at about 5 wt. % or less, more desirably 1 wt. % or less.

With the Hummers-Offeman method, usually, hydrogen peroxide is added after hydrolysis to decompose permanganate ions into manganese (IV) ions, whereafter the manganese ions are removed by washing with water along with other sulfate ions and potassium ions (W. S. Hummers et al., J. Am. Chem. Soc., 80, 1339(1958)). However, if the system becomes neutral, the solubility of manganese ions may lower and turn into manganese hydroxides, remaining between the layers. Hence, before washing with water, it is desirable to do thorough washing with an aqueous solution of sulfuric acid or a mixed aqueous solution of sulfuric acid and hydrogen peroxide.

A concrete purification operation by washing may employ publicly known means such as decantation, filtration, centrifugation, dialysis or ion exchange. As the particle diameter of the starting graphite decreases, or as the separation of the layers proceeds to increase thin-film-like particles, or as the removal of small ions progresses, electric charges per unit volume of the thin-film-like particles increase. As a result, repulsion between the particles strengthens, and the degree to which the dispersion medium is retained (for water, the degree of hydration) also heightens, thus making any purification operation difficult. In this case, the operation with a relatively high purification efficiency is centrifugation, dialysis, or ion exchange. In particular, the operation capable of purification in a relatively short time is centrifugation. On the other hand, decantation or filtration is slow in sedimentation or undergoes blockade due to thin-film-like particles, thus posing more difficulty as the diameter of the thin-film-like particles decreases. To lower the repulsion between the particles temporarily, the use of other solvent with a low dielectric constant, or salting-out may be suitably combined with the purification operation.

During purification, the separation of the multi-layer structure into the layers occurs spontaneously. Besides, a stirring operation, such as shaking, is added during formation of a uniform dispersion upon re-adding of water after removal of water together with small ions, so that the separation is further promoted. Ultrasonication is also usable, but tends to break the fundamental structure of the respective layers into small structures according to the separation of the layers, and so is desirably used when it is desired to form thin-film-like particles with a particularly small diameter.

Purification in the above-described manner promotes the separation of the layers inside many particles. However, particles, which do not take a thin-film-like shape and in which the separation of the multi-layer structure into the layers is insufficient, also remain in small amounts. These particles are impurities in the starting material (i.e., graphite difficult to separate, and other inorganic substances), and foreign bodies incorporated during oxidation or purification. These particles generally are apt to sediment, and thus can be removed by decantation or very slow centrifugation during purification.

The above procedure promotes the separation of the layers within many particles. The possibility for separation rises even in the layers, which have not been separated. However, since the particles are big, many hydrogen bonds, etc. may be present in the interlayer spaces within the particles, thus making separation in a short time substantially difficult. A method for further promoting separation of the layers would be to dilute the dispersion after completion of purification, and then strengthen the molecular movements of the dispersion medium or the movements of thin-film-like particles. Concretely, the method includes, for example, ultrasonication or heating of the dispersion. However, ultrasonication, as stated earlier, tends to destroy and divide the fundamental structures of the respective layers in accordance with the separation of the layers. With heating, the degree of ion dissociation can be expected to become high. However, at particularly high temperatures, the particles are likely to be partially reduced, so that heating is desirably performed at not so high temperatures. Concretely, the temperature is 50 to 150° C.

To selectively obtain particles, in which the separation of the layers proceeds further, fractionation according to differences in dispersibility is recommendable. For example, it is advisable to perform decantation or relatively slow centrifugation and use non-sedimentation parts.

The above-described respective operations accomplish a dispersion of thin-film-like particles with a very small thickness, which can be called nanofilms, dispersed in water.

When this dispersion of the thin-film-like particles, like common graphite oxide, is dried at a high concentration, many particles aggregate and become difficult to disperse again. (Many studies hitherto done on the structures of graphite oxides have been on solids in the aggregated state, and such thin-film-like particles as in the present invention have not been known.) In using the thin-film-like particles for concrete purposes, therefore, it is desirable to store and handle them, if possible, in the as-dispersed state, to obtain minimally aggregated thin-film-like particles from a very low concentration dispersion by drying, spray drying, or freeze drying, or to use them in the dispersed state and mix them with other substance.

When the thin-film-like particles are used in the as-dispersed state, a dispersion medium other than water may be desirable depending on uses. In this case, it is recommendable to replace the present dispersion medium with the other dispersion medium by using the other dispersion medium during the above purification, or by repeating the step of concentrating the dispersion by centrifugation or the like after purification to decrease the water, then adding the other dispersion medium, mixing the system, and then concentrating the mixture by centrifugation or the like. The thin-film-like particles have high polarity, and thus show high affinity for a polar dispersion medium with a high dielectric constant. Thus use of such a dispersion medium results in minimal aggregation of the thin-film-like particles. Concretely, a dispersion medium having a relative dielectric constant of about 15 or more is desirable. If, at the time of replacement of the dispersion medium, the two dispersion media are poorly miscible, replacement may be performed via a third dispersion medium with satisfactory miscibility with both of the two dispersion media.

The thin-film-like particles obtained in the present invention have functional groups such as hydroxyl groups. Thus, their reaction with, for example, formaldehyde, carboxylic acids, isocyanates, and epoxides can be expected. In this case, if other molecules to be reacted with the thin-film-like particles have a plurality of functional groups or a functional group forming a plurality of bonds, these molecules crosslink a plurality of thin-film-like particles.

When the thin-film-like particles obtained in the present invention are mixed with other organic or inorganic polymerizable material and the polymerizable material is polymerized, a composite containing the thin-film-like particles can be formed. In this case, a dispersion of the thin-film-like particles is mixed with the other polymerizable material, and the polymerizable material is polymerized after removal of the dispersion medium, aggregation of the thin-film-like particles in the composite can be minimized.

When a methanol dilution of the thin-film-like particles obtained in the present invention is dropped onto a metal mesh, and the liquid is evaporated, a dry thin film forms. The particles in the liquid are at a low concentration and minute, but they are tied to each other during drying to form thin films integrated so as to cover not only surface of the mesh but also its opening portions. The thin films formed at the opening portions of the mesh are in an isolated state. These isolated films can also be called nanofilms.

For observation under a transmission electron microscope (TEM), a sample must be maintained stably. Thus, a carbon microgrid (here, a microgrid corresponds to a microporous mesh) having many small openings is laminated to the above-mentioned metal mesh, and a thin film is prepared on the laminate by the same manner as described above. The resulting product is inserted into the TEM, and very thin regions where electron beams are clearly transmitted are observed. The morphology, thickness, micrographic structure, crystallographic structure, composition, and electronic state are analyzed through image observation, observation of the diffraction pattern, and observation of the electron energy loss spectroscopy spectrum.

If an electronic nature is required to the thin-film-like particles obtained in the present invention, it is desirable to reduce the thin-film-like particles into an electronic state composed mainly of $sp^2$ bonds similar to graphite, thereby enhancing electric conductivity. For reduction, various known reduction reactions or electrode reactions using reducing agents (i.e., electrolytic reduction) can be used. When a reducing agent is used, in particular, complete reduction up to the interior of multi-layer particles may be difficult, unless decomposition can be extended up to the fundamental layers. As a general behavior of graphite oxide, it is known that a structure resembling graphite can be formed, by heating, as far as the interior of the multiple layers; and that upon heating with a plurality of particles being in an aggregated state, intermolecular forces occur in interlayer spaces inside the multi-layer particles or between the plural particles, whereby a macroscopic shape, such as an ordinary graphite film, can be imparted (J. Maire et al., Carbon, 6, 555(1968)). The thin-film-like particles of the present invention have a particularly thin shape. Thus, when given a graphite-resembling structure by similar heating, the thin-film-like particles turn into thin-film-like graphite particles, which can be called carbon nanofilms or graphite nanofilms. Such thin-film-like graphite particles (singular form), or larger film-like structure materials (collective matter) comprising a plurality of the thin-film-like graphite particles aggregated in a planar form, are expected to show a two-dimensional quantum effect in the electronic nature or the like. For concrete uses, for example, the thin-film-like particles may be placed on a suitable substrate with high resistance to heat, and reduced by heating, whereafter the resulting thin-film-like graphite particles may be worked into a predetermined shape by various etching methods, etc.

The thin-film-like graphite particles can be mixed with other polymerizable material, and the polymerizable material can be polymerized to form a composite containing the thin-film-like graphite particles. Electric conductivity, for example, can be imparted to the composite.

The thin-film-like graphite particles can also become precursors for novel carbon structure materials, such as thin-film-like diamond and thin-film-like large hydrocarbon.

The thin-film-like particles obtained in the present invention are thin structure materials having a dense carbon skeleton. Thus, the particles in an singular form, or larger film-like structure materials comprising a plurality of the particles aggregated in a planar form, including the particles in reduced form, can become film materials having selective permeability or shielding properties to elementary particles, such as muons or protons, small ions, and low molecules.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will now be described in more detail by the following examples, which in no way limit the invention.

EXAMPLE 1

Natural graphite (SNO-25, SEC Corp., a purified product with purity of 99.97 wt. % or more, rid of impurities by heating at 2900° C., average particle diameter 24 $\mu$m, 5 wt. % each of particles with diameters of 4.6 $\mu$m or less and 61 $\mu$m or more) in an amount of 10 g, and 7.5 g of sodium nitrate (purity 99%) were placed in an Erlenmeyer flask. Sulfuric acid (345 $cm^3$; purity 96%) was added, a stirrer chip was placed in the mixture, and the mixture was stirred under cooling in an ice water bath. Potassium permanganate (45 g; purity 99%) was gradually added over about 1 hour. Cooling was completed in 2 hours, and the mixture was allowed to stand for 5 days at about 20° C. with gentle stirring. The resulting highly viscous liquid was added to 1000 $cm^3$ of a 5 wt. % aqueous solution of sulfuric acid (water with electric conductivity of less than 0.1 $\mu$S/cm was used for dilution (the same is true of the following description)) over about 1 hour with stirring, and the mixture was further stirred for 2 hours. To the resulting liquid, 30 g of hydrogen peroxide (a 30 wt. % aqueous solution) was added, followed by stirring the mixture for 2 hours.

The mixture was transferred into 3 centrifugal bottles (capacity: about 400 $cm^3$), and centrifuged (maximum rotation radius 17 cm (the same is true for the following description), 1000 rpm, 10 min). The supernatant liquid (some sediment contained; the same is true for the following description) was discarded to leave only a precipitate. With the precipitate placed in the centrifugal bottles, a mixed aqueous solution of 3 wt. % sulfuric acid/0.5 wt. % hydrogen peroxide (volume of the solution: about 6 to 4 times the amount of the precipitate; the volume ratio decreased with the progress of the procedure) was added. Then, the centrifugal bottles were capped, and shaken to redisperse the precipitate. Upon centrifugation (3000 rpm, 20 min), the supernatant liquid was discarded. This procedure was performed 15 times. A total of about 13 kg of the mixed aqueous solution was used.

The liquid to be added was replaced by water, the water was added, and the procedure involving redispersion, centrifugation (7000 rpm, 30 min), and discard of the supernatant liquid was repeated twice. Further, water was added to redisperse the system. The dispersion was allowed to stand for one day to precipitate a small amount of easily precipitable particles (such as thick particles). The precipitate was removed, the liquid that did not sediment was centrifuged (7000 rpm, 30 min), and the supernatant liquid was discarded. Aside from the supernatant liquid, there were a minimally flowable precipitate in the lower part of the system, and a slightly high-viscosity liquid in the upper part. They totaled about 650 $cm^3$.

The minimally flowable precipitate and the slightly highly viscous liquid were stirred to form a homogeneous liquid, and about a half of the liquid (the remaining half for use in Example 2) was divided into 6 centrifugal bottles. Similarly, water (about 5 volumes to 0.4 volume; volume ratio decreased as the procedure proceeded) was added, and an operation involving redispersion, centrifugation (7000 rpm, 60 min) and discard of the supernatant liquid was repeated a total of 20 times. Then, a small amount of water was added, and the mixture was stirred to obtain 1350 cm$^3$ of an aqueous dispersion of highly purified thin-film-like particles. A portion of the dispersion was dried, and the weight after drying was compared with the weight before drying to determine the concentration of the thin-film-like particles in the dispersion to be 0.45 wt. %.

The resulting aqueous dispersion was placed on a glass plate, dried for about 10 days at a temperature of about 20° C. and a relative humidity of about 40%, and measured by X-ray diffraction. A peak corresponding to 0.83 nm was obtained. This value corresponds to the interlayer distance of graphite oxide (retaining water in the interlayer spaces) generally known.

Figure 1:
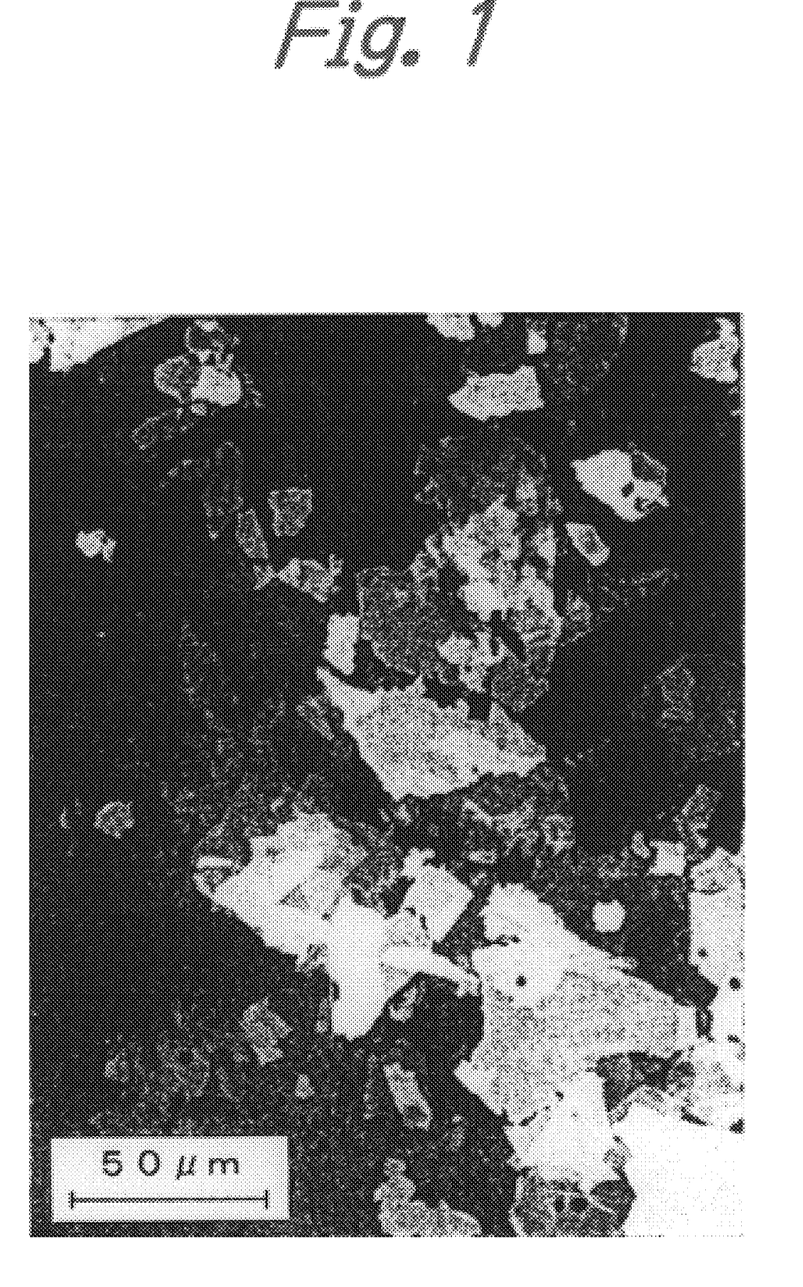
FIG. 1 is an image of thin-film-like particles (on a glass plate) observed through an optical microscope.

The resulting aqueous dispersion was placed in a small amount on a glass plate, dried, and then observed under an optical microscope (OM). There were large thin-film-like particles with a clear contour and a planar breadth measuring up to several tens of micrometers, as shown in FIG. 1, and a film-like material covering the entire surface of the glass plate (this material has a high possibility of being a collective matter of particularly thin particles, upon comparison with the electron microscopic observation to be described in Example 3). Also, the particles were well transparent to light, and were suitable for observation with reflected light.

The same aqueous dispersion was diluted 1:100 with water, then placed on a glass plate, and dried. It was attempted to calculate the mean thickness of the thin-film-like particles. When the average thickness of the stacked particles adhering to the glass plate after drying from the dispersion was calculated at about 12 nm (the density of the particles is estimated at 2.1 g/cm$^3$), OM observation confirmed that nearly about 3 or more pieces of the particles stacked on the entire surface where the liquid spread (the particles were very thin, but were discernible because their reflective index was higher than that of glass). Thus, the thicknesses of the individual thin-film-like particles were less than 4 nm on the average.

As noted above, the resulting thin-film-like particles were found to be extremely thin.

EXAMPLE 2

The remaining half of the homogeneous liquid formed in Example 1 was sealed up in a regenerated cellulose tube (having a sectional area of 5 cm$^2$, a thickness of 30 $\mu$m, and a fractionation molecular weight of 12000 to 14000, and is permeable to particles with a diameter of about 3.5 nm or less, when calculation is made assuming spherical protein with a density of 1 g/cm$^3$). The liquid was dialyzed with about 20 volumes of water as an outer liquid. The outer liquid was replaced at intervals of about 2 days a total of 10 times, and then the inside liquid was withdrawn to obtain 450 cm$^3$ of an aqueous dispersion of highly purified thin-film-like particles. The concentration was 1.5 wt. %.

OM observation and TEM observation confirmed very thin particles similar to those in Example 1.

EXAMPLE 3

The aqueous dispersion obtained in Example 1 was diluted with methanol (purity 99.8%) to a particle concentration of 0.01 wt. %, and shaken in a closed glass bottle. The dilution was pumped by a dropping pipette, and dropped onto a copper mesh (a mesh of a copper sheet with a diameter of 3 mm and an opening diameter of 0.2 mm), followed by evaporating the liquid. The individual particles in the liquid stacked, and also tied in the direction of breadth, during drying, forming thin films integrated so as to cover the openings of the mesh in addition to its surface. Observation by OM showed the thickness of the thin films to be uneven based on a differences of the transmissivity of light. The degree of unevenness differed from opening to opening of the mesh, but relatively uniform and thin films were noted on some openings. The thin films formed over the opening portions of the mesh were out of contact with the copper sheet, and remained isolated. A stacked-layer isolated film uniform across the opening portion with thickness of 2 nm has an aspect ratio 0.2 mm/2 nm=10$^5$.

To the above-mentioned dilution, a small amount of powdered natural graphite was added as a reference material. Then, the mixture was dropped onto a carbon microgrid-covered copper mesh (the aforementioned copper mesh covered by a carbon microgrid having many openings of 1 to 7 $\mu$m in diameter), and dried to obtain isolated films on the opening portions of the carbon microgrid. These films were observed beforehand by OM to confirm the locations of regions with a large thickness or a small thickness. Then, the very thin regions were observed under a transmission electron microscope (TEM).

In a TEM image with a low magnification (direct magnification of 10,000 or less), no particular patterns were observed in a wide range, and these regions appeared to be flat. However, close observation showed many low-contrast, irregularly oriented, long and short lines as shown in FIG. 2.

Figure 2:
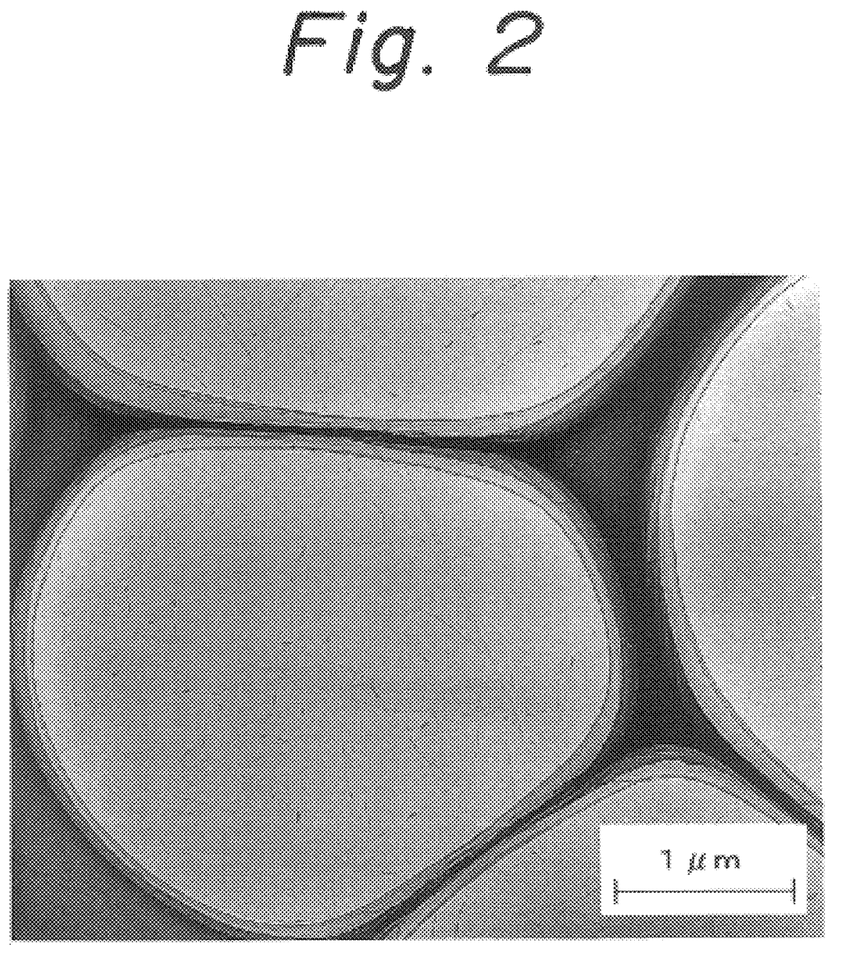
FIG. 2 is a transmission electron microscope (TEM) image of a very thin isolated film (many lines represent wrinkles of lattice planes, and a mesh-like part represents a carbon microgrid)
Figure 3:
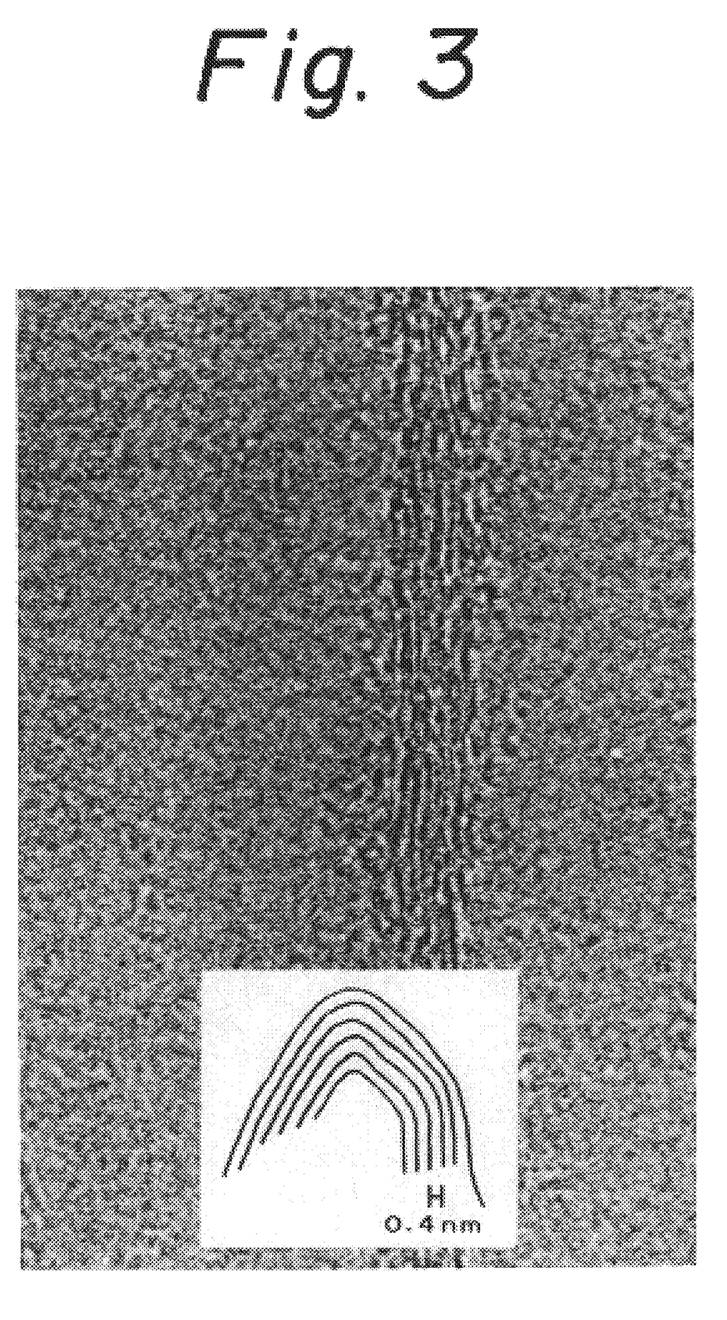
FIG. 3 is a TEM image of the wrinkled portion in FIG. 2 in an enlarged form (black lines represent carbon six-membered ring lattice planes, and an inset is a sectional view showing a bend of the carbon lattice plane)

A high-magnification (direct magnification of 200,000 or more) TEM image of the lines in FIG. 2 is presented in FIG. 3, which shows that the lines comprised stripe patterns called lattice fringes. These patterns appear because of the existence of regions in which carbon six-membered ring lattice planes (to be described later on) are perpendicular to the surface of the mesh (i.e., parallel to the incident direction of an electron beam). That is, the particles obtained by separation of the layers flatten in most regions during drying. In the above-mentioned regions, on the other hand, the particles may have locally formed wrinkled structures (structures rising vertically relative to the entire film plane direction, and then returning to the original state; the rising portions and the returning portions may be adjacent to or spaced from each other). The spacing of the lattice fringes varied from 0.3 to 0.6 nm, but was mostly close to 0.4 nm.

The lattice fringes gathered with a plural number. If the plural fringes are taken as a set, a set of fringe patterns consisted of 5 to 10 fringes in most cases, a few fringes locally, or one fringe rarely. The film thickness can be determined from the number of the fringes. When there were 10 fringes, 5 of the rising portions and 5 of the returning portions, if the two portions are adjacent arrangement, will give a film thickness of about 2 nm, while the film thickness will be about 4 nm if they are spaced.

The existence of such wrinkles shows that the tip of the wrinkle has a very high curvature, namely, that the very thin film in question has very high flexibility.

Figure 4:
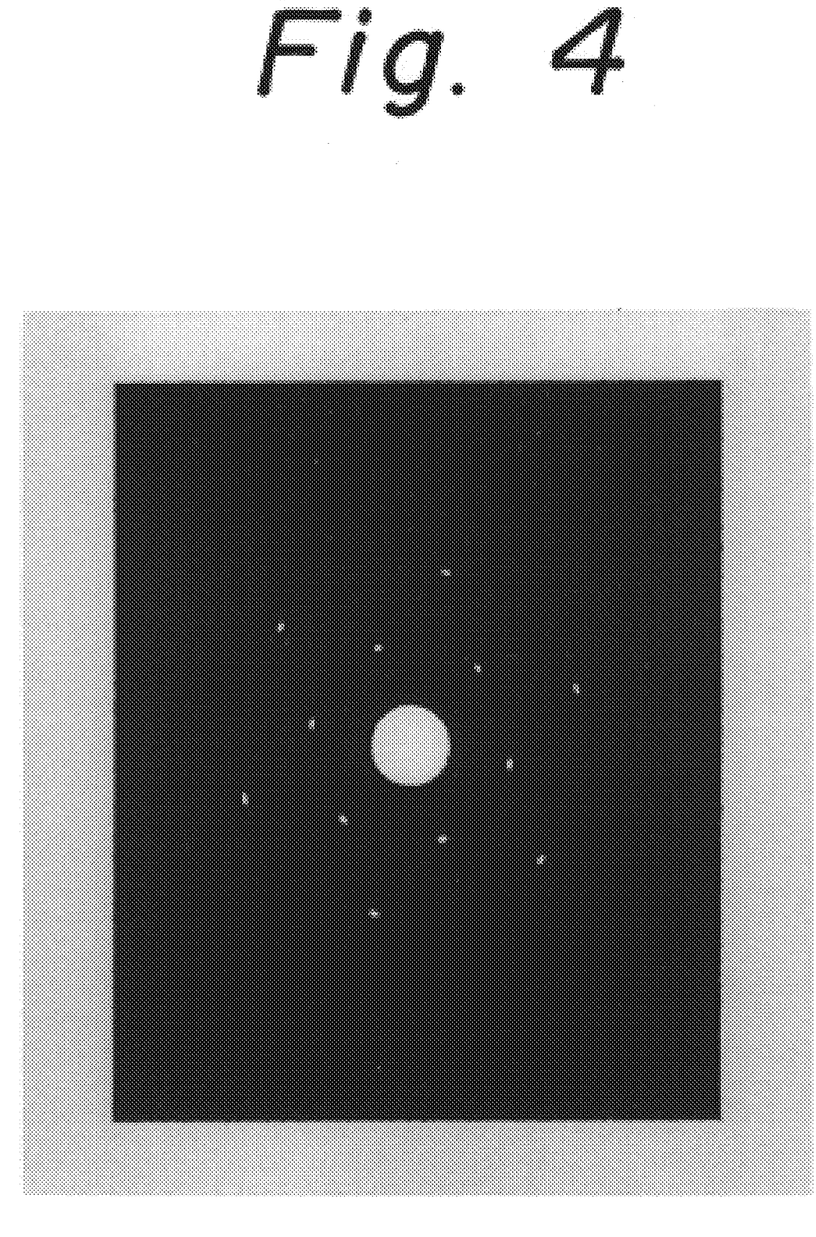
FIG. 4 is an electron diffraction pattern of the very thin isolated film (the sample is not inclined)

An electron diffraction (ED) pattern from the regions in FIG. 2 showed a set of 6-fold rotation symmetry as shown in FIG. 4. The spacing of lattice planes at the innermost diffraction spots in this ED pattern is calculated to be about 0.215 nm with reference to the ED spots from the natural graphite. Hence, they are the diffraction spots from the (100)-planes, showing that this diffraction pattern occurs from a lattice plane formed by a condensation of carbon six-membered rings.

Regions different from the above regions gave a diffraction pattern of two sets of 6-fold rotation symmetries rotated by several degrees relative to each other. This finding shows that in these regions, regions of two sets (different in orientation) of carbon six-membered ring lattices rotated by several degrees were stacked. From other regions, three or more sets of diffraction patterns in 6-fold rotation symmetry were obtained. This finding shows that three or more sets of the lattices were stacked.

Figure 5:
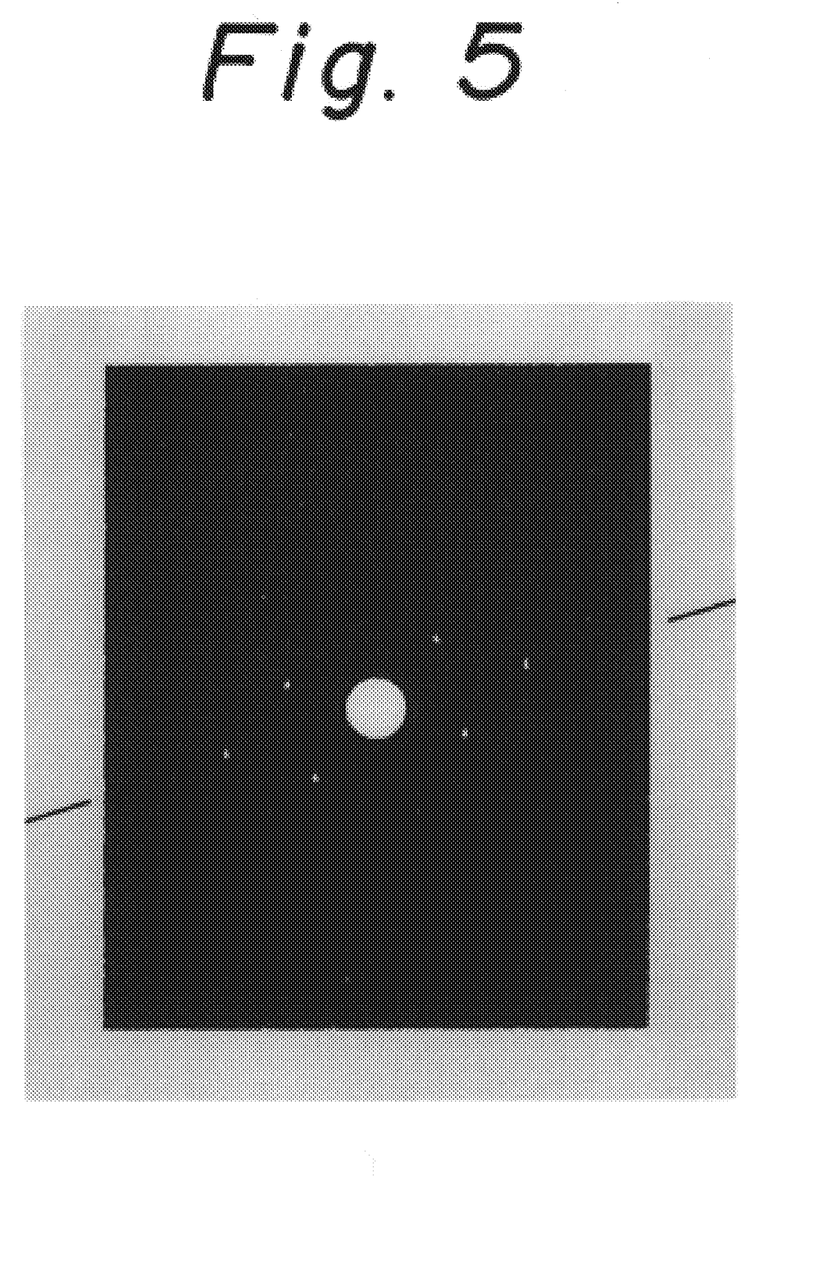
FIG. 5 is an electron diffraction pattern of the very thin isolated film (the sample is inclined by 300 about a linear direction in the drawing as an axis)

The region where the ED patterns of FIG. 4 were photographed was inclined up to 30° in TEM, and an ED pattern was obtained at the inclination intervals of 5°. For example, the ED pattern obtained after inclination to 30° is shown in FIG. 5. Changes in a series of ED patterns indicated that the diffraction spots elongate in a direction perpendicular to the film plane, and the magnitude of the elongation was about 2.5 nm$^{-1}$. These findings show that the thickness of the scatterer (not the thickness of the film) giving the diffraction pattern is 1/2.5=0.4 nm. It can be said, therefore, that 0.4 nm thick monolayer films having a carbon monolayer structure as a skeleton are present independently, and they are stacked non-periodically to constitute this thin film. Bonds between the independent layers are very weak. The orientation of the six-membered ring plane lattice in each layer is maintained, but there is no strict translational periodicity in the stacking direction. In other words, in FIG. 3, the carbon plane lattices are stacked to constitute a crystal apparently. Actually, however, the layers independent of each other are simply stacked.

Figure 6:
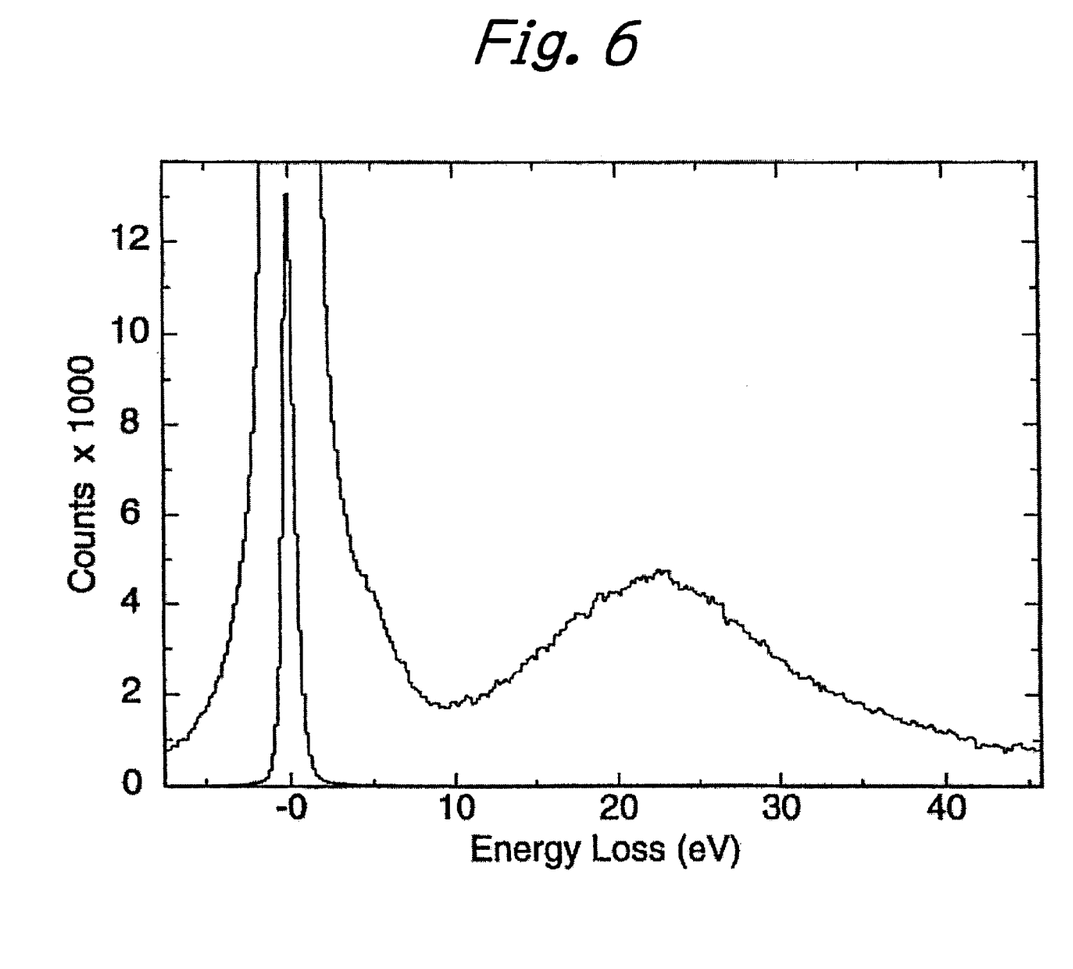
FIG. 6 shows the electron energy loss spectroscopy spectrum (low energy loss side) of the very thin isolated film (the lower curve represents an overall view)
Figure 7:
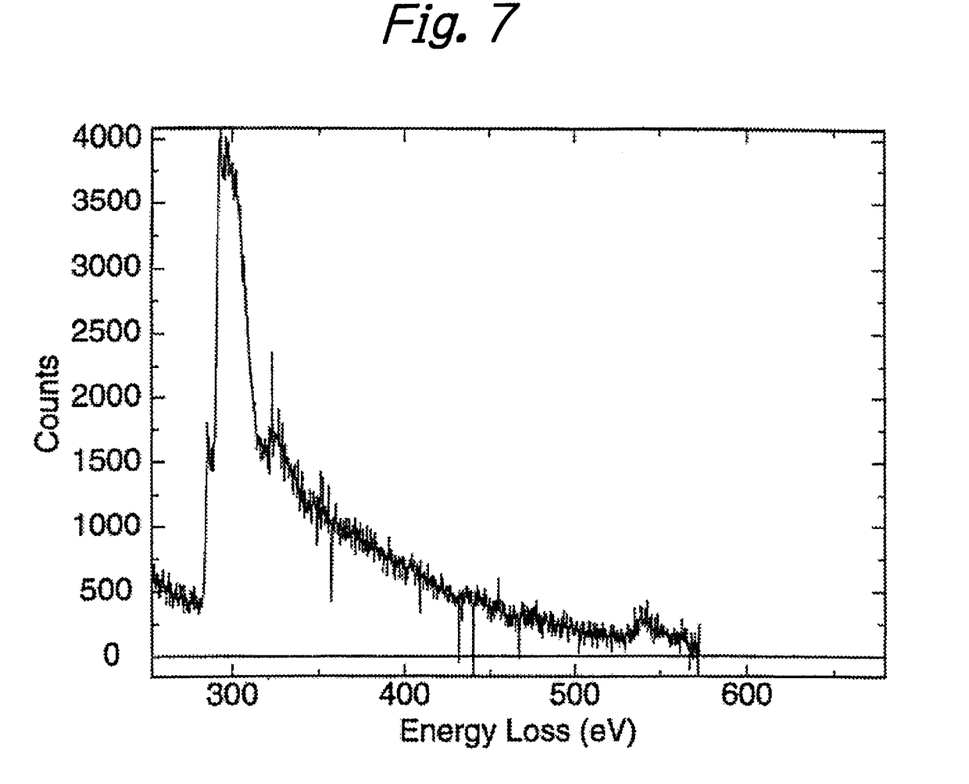
FIG. 7 shows the electron energy loss spectroscopy spectrum (high energy loss side) of the very thin isolated film.

The electron energy loss spectroscopy (EELS) spectrum was measured in the thin flat regions. The results are shown in FIGS. 6 and 7. FIG. 6 depicts the results on the low energy loss side, on which ($\sigma$+$\pi$ plasmon-loss peak (23 eV) and n plasmon-loss peak (7 eV, peak of shoulder) occur. FIG. 7 shows core-loss peaks on the high energy loss side, indicating peaks corresponding to the absorption edge of K-shell of carbon (285 eV) (i.e., $\pi$* and $\sigma$* peaks) and a peak corresponding to the absorption edge of K-shell of oxygen (530 eV). Based on these results, the molar ratio between carbon and oxygen is calculated at O/C=0.10. Further, in consideration of the fact that the present isolated film contains trace hydrogen, the proportion of oxygen was calculated at 12 wt. % or less. These measurements demonstrated the following facts: 1) The constituent elements of the thin film are mostly carbon, and include a small amount of oxygen. 2) The electronic structure of the thin film resembles that of graphite or graphene, and contains $\pi$ bonds. However, the $\pi$* peak is clearly low in intensity in comparison with the EELS spectrum of a graphite crystal. The $\pi$ plasmon peak also lowers.

The above results of observation were interpreted overall in view of the results of the image observation and the ED observation, and the following conclusion was reached: The skeleton of the independent layer with a thickness of 0.4 nm is a carbon monolayer structure, namely, a structure close to graphene, and has a small amount of oxygen bonded to the surface thereof. Bonding of oxygen changes its electronic structure. The low $\pi$* core-loss peak and the low $\pi$ plasmon-loss peak mean the decrease in $\pi$ bonds. Accordingly, the present substance is considered not to take a semi-metallic electronic structure known with graphite, but to take a non-metallic electronic structure.

EXAMPLE 4

A portion of the aqueous dispersion of thin-film-like particles obtained in Example 1 was centrifuged (7000 rpm, 30 min), and the supernatant liquid was discarded. A liquid portion with a slightly high viscosity in an upper part of the residue was withdrawn in a small amount, placed in a glass bottle, and diluted about 1:100 with water. The glass bottle containing this liquid was placed on a hot plate at 150° C. to heat (boil) the liquid for about 20 minutes.

The resulting liquid was diluted about 1:10 with methanol, and dried on a copper mesh covered by a carbon microgrid. The sample was observed beforehand through OM to confirm regions with many stacks of the thin-film-like particles and regions with few stacks of the particles placed on the microgrid. Then, the sample was observed with TEM.

In any regions, similar wrinkles to those in Example 3 were observed, but the wrinkles were not so clear as in Example 3. It was attempted to observe wrinkles, present in the regions with few stacks, under high magnification. However, the attempt failed, because wrinkles may have disappeared through the thermal influence of a strong electron beam. Wrinkles in the regions with many stacks, on the other hand, were observable, though unclear, probably because particles with wrinkles were reinforced with other particles without wrinkles. Based on a particularly narrow portion of particularly narrow wrinkles, the thickness of the thin-film-like particles was determined to be less than about 1 nm. This is smaller than in Example 3. In consideration of the size of the functional groups present on the surface of the fundamental layer, such as hydroxyl groups, the thickness obtained was close to the thickness of the fundamental layer. This has led to the conclusion that the original multi-layer structure separated into the fundamental layers nearly completely.

EXAMPLE 5

An aqueous dispersion of thin-film-like particles was obtained in the same way as in Example 1, except that natural graphite with a large particle diameter (SEC Corp. a purified product with purity of 99.76 wt. % or more, rid of metal elements, etc. by heating at 2900° C., in scale form with a particle diameter of 1.4 to 2.0 mm and a thickness of 0.1 mm or less) was used in an amount of 1 g, and oxidized while being allowed to stand for 10 days, with very slow stirring.

OM observation showed that the resulting particles had an average dimension in the planar direction of about 0.1 mm, but included some particles measuring about 0.3 mm or more.

EXAMPLE 6

The aqueous dispersion of thin-film-like particles obtained in Example 1 was placed in a centrifugal bottle, and acetone (relative dielectric constant at 25° C.: 20.7, purity: 99.5%, amount: about 2 to 4 volumes of the aqueous dispersion, the volume ratio increasing with the progress of the procedure) was added. Then, a procedure involving redispersion, centrifugation (7000 rpm, 30 min), and discard of the supernatant liquid was repeated a total of 3 times. The resulting precipitate was a mass with a concentration of about 1.7 wt. % and without flowability.

With this mass placed in the centrifugal bottle, 2-butanone (relative dielectric constant at 20° C.: 18.5, purity: 99%, amount: about 4 volumes of the acetone dispersion) was added, and the procedure involving redispersion, centrifugation (7000 rpm, 30 min), and discard of the supernatant liquid was repeated a total of 3 times. The resulting precipitate was a mass with a concentration of about 2.0 wt. % and without flowability.

As described above, the thin-film-like particles were able to form a dispersed system even in a liquid other than water. However, with the decrease in the dielectric constant, interparticle repulsion diminished, facilitating the formation of a higher concentration of precipitate. Because of their high anisotropy of shape, the surrounding dispersion medium was retained even at a low concentration of several %, and the flowability of the dispersion markedly declined.

Further, 2-butanone was added to the precipitate of the thin-film-like particles containing 2butanone, followed by stirring to redisperse the precipitate, thereby forming a 2butanone dispersion containing about 0.5% of the thin-film-like particles. This dispersion and epoxy resin (cresol-novolac-epoxy type, imidazoles as a hardening agent, a 60 wt. % 2butanone solution) were mixed, and heated at 60° C. under reduced pressure to remove 2-butanone. Then, the mixture was hardened for 2 hours at 160° C. to obtain a composite having about 1.5 wt. % of the thin-film-like particles uniformly dispersed.

EXAMPLE 7

The aqueous dispersion of thin-film-like particles obtained in Example 1 was placed on a glass plate. Separately, a 1:200 methanol dilution of the same aqueous dispersion was placed on a copper mesh covered by a carbon microgrid. Both samples were dried at about 20° C. and then heated at 200° C. to reduce the thin-film-like particles.

The reduction product (thickness about 30 $\mu$m, breadth about 2 cm×2 cm) on the glass plate was measured for electric resistance using an ordinary circuit tester, with the distance between electrodes set at 1 mm. The electric resistance was about 800 $\Omega$ (a lower oriented graphite sheet of 0.5 mm in thickness was found to have 1.5 $\Omega$ by the same measuring method). When this reduction product was peeled from the glass plate, and heated at 1000° C., it showed electric resistance of about 5 $\Omega$.

The shape of the particles placed on the copper mesh was observed by OM. The shape after heating at 200° C. showed little change from the shape before the heating. Upon heating, the particles were slightly colored, increasing the reflective index. However, the particles were semi-transparent because of their small thickness placed on the mesh.

EXAMPLE 8

The aqueous dispersion containing thin-film-like particles obtained in Example 5 was diluted with water, placed on a glass plate, dried at about 20° C., and then heated at 200° C. to reduce the thin-film-like particles. Upon OM observation, the particles on the glass plate before reduction were discernible only partly by a weak contrast between light and shade; after reduction, the already discernible particles became very easily recognizable, and particles discernible by a weak contrast between light and shade were seen on the entire surface of the glass plate. This may be because the particles were slightly colored by reduction, and increased in reflective index, so that even thinner particles became recognizable. These particles were semi-transparent even after reduction.

EXAMPLE 9

The aqueous dispersion containing thin-film-like particles obtained in Example 1 was diluted about 1:50 with water. Aluminum powder (purity 99.9%, average particle diameter 3 $\mu$m) and hydrochloric acid (35 wt. % aqueous solution) were added to the dilution, and the mixture was ultrasonicated to make an attempt at hydrogenation of the thin-film-like particles. The thin-film-like particles were reduced at least on their surface, becoming hydrophobic, macroscopically black particles, and mostly floating on the liquid surface. The resulting particles were washed with water by filtration, recovered together with a small amount of water, without being dried, and placed in a vessel.

Figure 8:
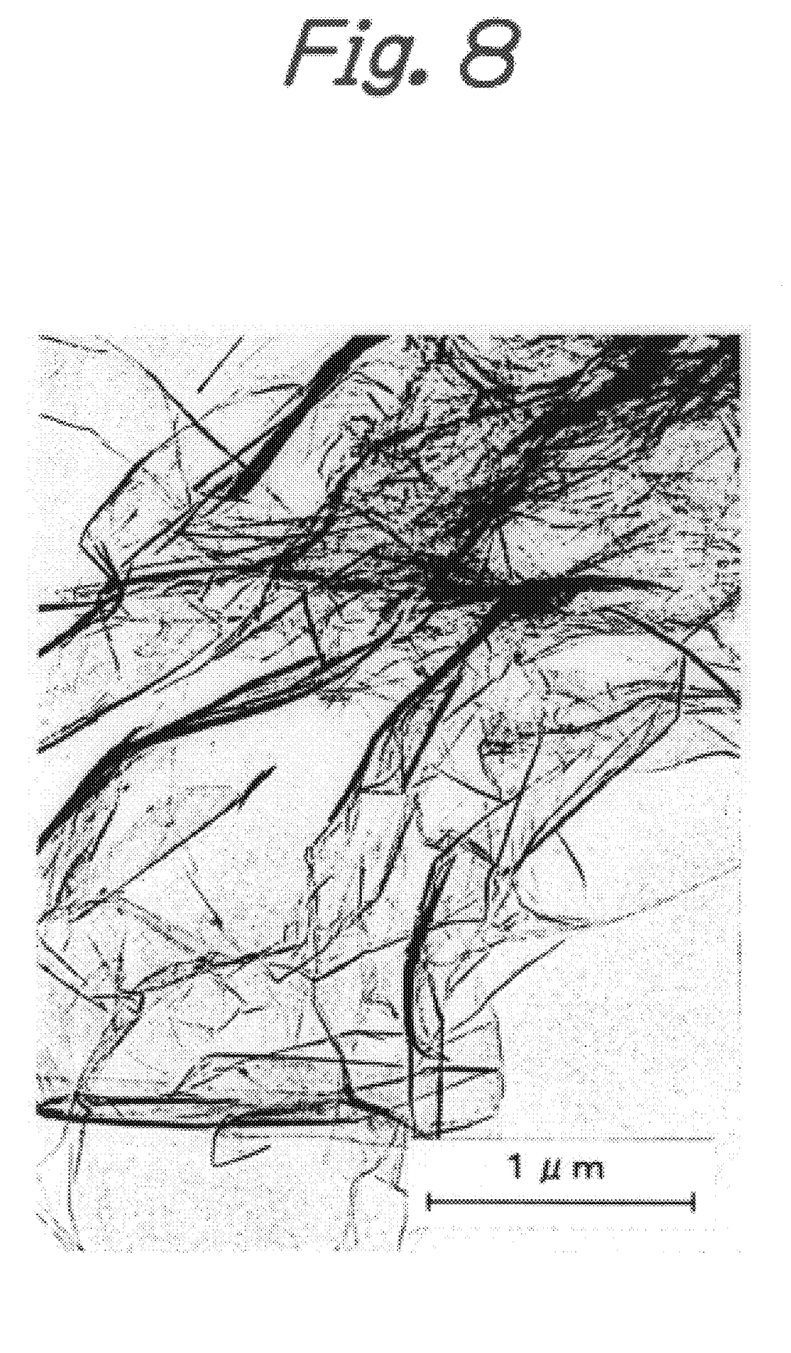
FIG. 8 is a TEM image of an aggregate of thin-film-like particles, which have been reduced with aluminum and hydrochloric acid.

The particles were dried, and various measurements were made on them. OM observation showed the resulting particles to be semi-transparent. TEM observation confirmed singular or plural aggregates of the thin-film-like particles irregularly bent and deformed like crumpled paper as shown in FIG. 8. X-ray diffraction measurement revealed complete disappearance of a peak corresponding to 0.83 nm observed in the original thin-film-like particles, showing that deformation and aggregation lowered orientation among particles extremely.

The thin-film-like particles of the present invention are so thin that deformation within the particles is possible, although they have a dense carbon skeleton. When their affinity for the dispersion medium lowers, it has been found that they may cause self-aggregation like a linear flexible polymer.

EXAMPLE 10

In the aqueous dispersion containing thin-film-like particles obtained in Example 1, two platinum electrodes (the areas in contact with the dispersion: 6 cm$^2$ each, spacing: 1 cm) were placed, and a direct current (about 0.02A at 19V) was applied. A highly viscous deposit of the same color as the thin-film-like particles formed on the positive electrode (based on a power source), while a black deposit formed on the negative electrode together with the generation of hydrogen.

The respective electrodes were placed in water accommodated in different vessels, and the respective deposits were separated from the electrodes. The deposit on the positive electrode dispersed in water again, and the same particles as the original thin-film-like particles were observed under OM. These particles were considered to be thin-film-like particles temporarily aggregated as a result of a slight decrease in hydroxyl groups. The product on the negative electrode precipitated without dispersing in water, and the same aggregate as in Example 9 was observed under OM. This aggregate was considered to be an aggregate formed by the reduction of thin-film-like particles by part of the generated hydrogen before it became a hydrogen molecule.

COMPARATIVE EXAMPLE 1

Oxidation and purification were performed in the same manner as in Example 1, except that synthetic graphite (TIMREX KS75, TIMCAL AMERICA INC., purity 99.9% or higher, average particle diameter about 15 $\mu$m) was used instead of natural graphite. There was formed a dispersion of particles with high affinity for water and clearly different from the starting synthetic graphite. This dispersion was lower in viscosity than the dispersion in Example 1, and formed a precipitate with a higher concentration upon centrifugation.

Observation through OM showed a majority of non-planar particles, and a minority of planar particles. These particles were all transparent, but most of them were enough thick to be easily recognizable with transmitted light.

COMPARATIVE EXAMPLE 2

Oxidation and purification of graphite were performed in the same manner as in Example 1, except that the oxidation time was 2 hours and the easily precipitable particles were not removed.

Observation through OM showed particles with a diameter of about 40 μm or less to be mostly transparent and in a thin planar shape. The greater particles, on the other hand, consisted of non-planar particles and planar particles, and all particles were enough thick to be easily recognizable with transmitted light. A peripheral part of the particles was transparent, but their central part was black and opaque. The central part was considered to be unoxidized.

COMPARATIVE EXAMPLE 3

In the same manner as in Example 1, graphite was oxidized, and washed with a mixed aqueous solution of 3 wt. % sulfuric acid/0.5 wt. % hydrogen peroxide. The dispersion after this washing was observed through OM. Most of the particles of the dispersion were planar particles, but a majority of them were enough thick to be easily recognizable with transmitted light. Comparison with Example 1 showed separation of the layers to proceed at a stage where small ions were removed.

COMPARATIVE EXAMPLE 4

The aqueous dispersion of thin-film-like particles obtained in Example 1 was heated to about 50° C. on a glass plate placed on a hot plate to remove water, thereby forming a dry mass about 0.1 mm thick.

The resulting dry material was put in water, and stirred for 6 hours. An aggregate recognizable with the naked eye was present, and complete redispersion was difficult.

As described above, the thin-film-like particles of the present invention are by far thinner than hitherto known graphite oxides, and have a highly anisotropic shape. Thus, these particles can flexibly deform, although they have a dense carbon skeleton within the particles. When composed with other substances, they can be expected to show various properties, such as high strength, with the addition of a low fraction. The isolated film obtained by the present invention has functions, such as high flexibility and non-metallic conductivity. When the thin-film-like particles are reduced into an electronic state similar to graphite, the reduction product shows electric conductivity. Since the product is in a very thin shape, it is expected to produce a two-dimensional quantum effect.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. Thin-film particles having a skeleton constructed by carbons, which are obtained by oxidizing graphite, have a thickness of 0.4 to 10 nm and a dimension in a planar direction of 20 nm or more, and are dispersible in a liquid having a relative dielectric constant of 15 or more.

2. A dispersion of thin-film particles prepared by dispersing the thin-film particles of claim 1 in a liquid having a relative dielectric constant of 15 or more.

3. A monolayer isolated film obtained from thin-film particles having a thickness of about 0.4 nm or more included in the thin-film particles of claim 1, said monolayer isolated film having a carbon monolayer structure as a skeleton, containing 1 to 30 wt. %, based on the entire monolayer isolated film, of oxygen bonded to the skeleton, and having a thickness of about 0.4 nm and a dimension in a breadth direction of 20 nm or more.

4. A transparent stacked-layer isolated film formed by integration of the monolayer isolated films of claim 3 stacked in a thickness direction and linked in a breadth direction, said transparent stacked-layer isolated film having a thickness of 20 nm or less and a dimension in the breadth direction of 100 nm or more.

5. Thin-film graphite particles or a collective matter of thin-film graphite particles obtained by reducing the thin-film particles of claim 1.

6. A method for synthesizing the thin-film particles of claim 1, comprising using as a starting material said graphite in which a diameter of a widest fundamental layer within particles of said graphite is nearly equal to a diameter of the particles of said graphite, and the particles of said graphite have a single multi-layer structure as a whole.

7. A method for synthesizing the thin-film particles of claim 1, comprising using as a starting material said graphite whose impurity content has been decreased to 0.5% or less.

8. A method for synthesizing the thin-film particles of claim 1, comprising oxidizing said graphite for an oxidation time of 30 minutes or more per 10 μm of a particle diameter of said graphite.

9. A method for synthesizing the thin-film particles of claim 1, comprising purifying an oxidation product, with a concentration of small ions other than small ions derived from the oxidation product in a reaction mixture being set at 10 mol/m$^3$ or less, after oxidation of said graphite.

10. A method for synthesizing the thin-film particles of claim 1, comprising purifying an oxidation product, with a concentration, when dispersed, of the oxidation product in a reaction mixture being set at 5 wt. % or less, after oxidation of said graphite.

11. A method for synthesizing the thin-film particles of claim 1, comprising removing particles, in which separation of a multi-layer structure has been insufficient, by precipitation during purification.

12. A method for synthesizing the thin-film particles of claim 1, comprising heating a dispersion of the thin-film particles at room temperature in a range of 50 to 150° C. to promote separation of a multi-layer structure within the thin-film particles into layers.

13. A method for preparing the dispersion of the thin-film particles of claim 2, comprising changing the liquid being a dispersion medium from water to other liquid having a different relative dielectric constant.

14. A method for synthesizing an isolated film, comprising forming the monolayer isolated film of claim 3 by use of a mesh having openings with an opening diameter of 100 nm or more, while spacing the monolayer isolated film from a substrate mesh.

15. A method for synthesizing the thin-film graphite particles or the collective matter of thin-film graphite particles claimed in claim 5, comprising reducing said thin-film particles by heating, by use of a reducing agent, or by an electrode reaction.

* * * * *